Patented Mar. 1, 1927.

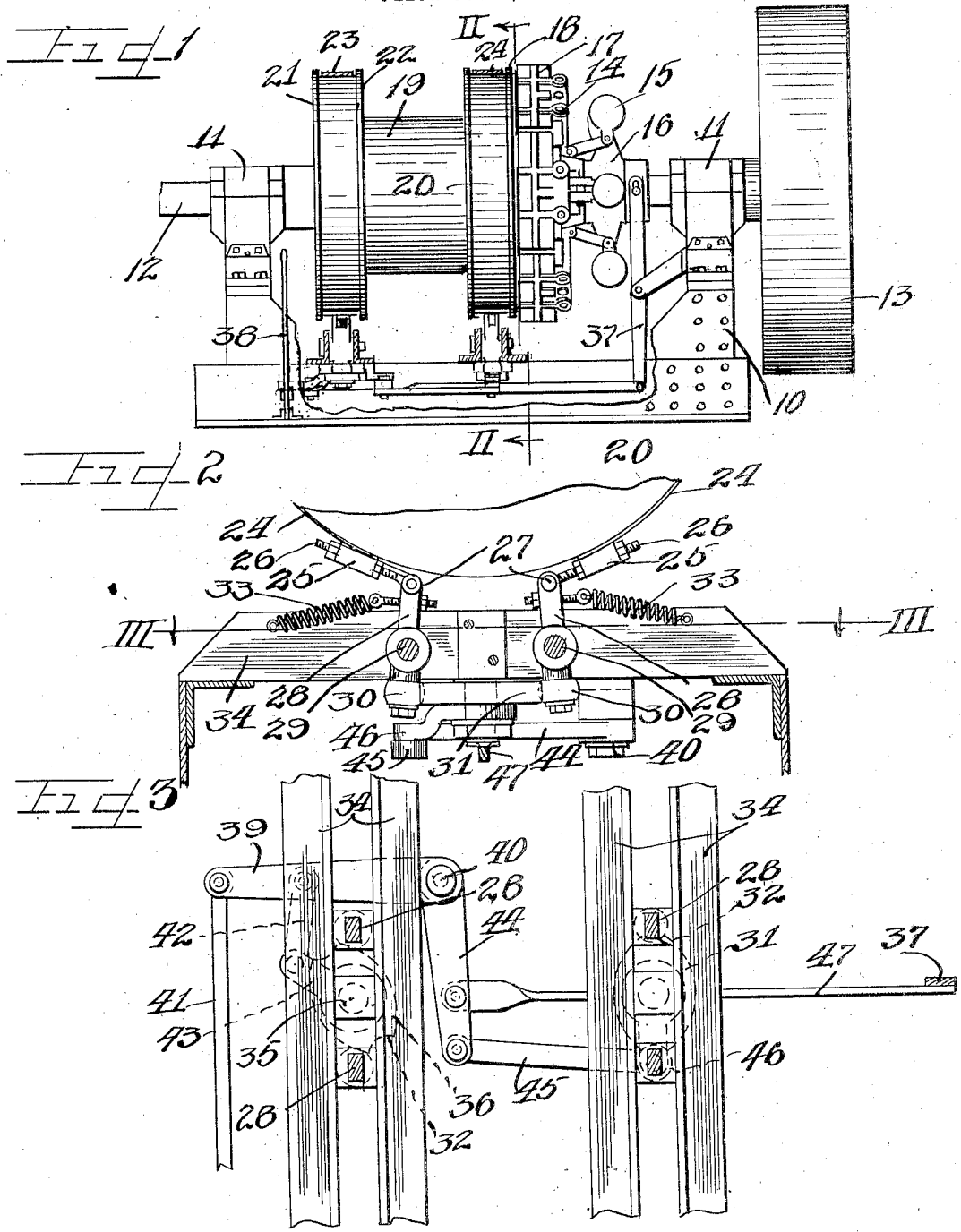

1,619,449

UNITED STATES PATENT OFFICE.

HARRY H. WATERS, OF CLINTON, IOWA, ASSIGNOR TO CLIMAX ENGINEERING COMPANY, OF CLINTON, IOWA, A CORPORATION OF DELAWARE.

NEUTRAL BRAKE.

Application filed October 5, 1925. Serial No. 60,367.

This invention relates to a neutral locking brake for planetary reversing pulleys, transmission, or hoisting drums; and more particularly to the use of a neutral brake together with suitable linkages whereby ahead, reverse and neutral clutches or brakes are operated under unitary control in properly timed relationship.

It is an object of this invention to provide an improvement in reversing clutch pulleys or cable drums, in which the reverse rotation is secured through planetary gearing of the spur or bevel type by clamping the spider carrying the planetary gears, and the forward motion is obtained by means of a clutch between the live shaft and the pulley or cable drums floating thereon. The improvement comprises a neutral brake for the pulley or cable drum. Such a brake is highly desirable because it would otherwise be highly difficult to maintain a true neutral position between the reverse and forward drums wherein there will be no rotation of the final drive pulley or drum. This is especially true when there is only a light load on the pulley or drum, because of the inherent friction of the planetary gearing which is in motion when the pulley or drum is idle.

It is also an object of this invention to provide a brake on the pulley or drum itself which is actuated by the same lever which operates the forward and reverse clutches thus placing complete control of the mechanism under one lever.

It is a further object of this invention to provide a device of the class described having a self locking arrangement for the brake mechanism adapted to securely lock the transmission or hoist in neutral with the brake engaged.

Other and further important objects of this invention will be apparent from the disclosures in the specification and drawings.

The invention (in a preferred form) is illustrated in the drawings and hereinafter more fully described.

On the drawings:

Figure 1 is a side elevation of a reversing transmission embodying the features of this invention;

Fig. 2 is a detailed fragmentary section showing the neutral brake engaging and locking mechanism; and Fig. 3 is a section on the line III—III of Figure 2 showing the interconnected control mechanism for the forward and reverse clutches and neutral brake.

As shown on the drawings:

The planetary reversing mechanism per se is well known so that the gearing has been omitted from the drawing for the sake of clearness. A frame 10 is provided with suitable journals 11 for a live shaft 12 carrying an outboard pulley 13 adapted to be driven by any suitable prime mover. The live shaft carries a clutch 14 shown in the drawing as a shoe clutch having centrifugal weights 15 on the sleeve 16 which is keyed to and slides to the left to contract the shoes 17, the weights being provided to counteract centrifugal action of the shoes and to permit a smooth and gradual decrease in the slip as the clutch picks up the load. The clutch shoes engage on a suitable rim 18 on a drum or pulley 19 which is free on the live shaft. A brake band drum 20 is provided alongside the clutch rim 18 for the neutral brake of this invention. A spider 21 is also freely and separately mounted on the live shaft alongside the pulley drum 19 and carries planetary reversing gearing meshing with suitable gearing within the pulley or drum 19. The periphery of the spider forms a brake drum 22 for the reversing brake band 23, clamping of this brake band while the clutch is disengaged from the pulley 19 serves to drive the pulley in the reverse direction. This above described planetary reversing transmission, is well known and is extensively used in marine reverse gears and in various industrial applications, the present invention relating to the use of a neutral brake together with interlocking operating mechanism therefor.

The reversing brake band 23 and the neutral brake band 24 together with the operating mechanism therefor may be exactly identical aside from the interconnecting linkage, so that only a description of the neutral brake mechanism will be given herein. The ends of the brake band 24 terminate in sockets 25 through which adjustable pull rods 26 pass, these rods being connected at 27 to levers 28 pivoted at 29 and carrying rollers 30 at their lower ends, said rollers engaging a cam 31 pivoted therebetween.

The cam is preferably in the form of an ellipse with small semicircles 32 cut out on the major axis to receive the rollers 30 when the brake is engaged, thus forming a locking engagement therewith which serves to hold the operating mechanism without attention from the operator. The brake band is retracted when released by means of the springs 33. This operating structure may be conveniently mounted on a cross frame comprising a pair of angles 34 with the pivoted levers 28 mounted therebetween, the cam being pivoted on a block 35 secured between the angles and forming a spacer therefor. It is of course apparent that a toggle operating mechanism of any well known form might be used in connection with the reversing band in lieu of the cam mechanism just described.

The operating mechanism interconnecting the reverse brake cam 36 with the neutral brake cam 31 and the clutch shifting lever 37 comprises a single lever 38 connected to the arm 39 of a bell crank pivoted at 40 by the push and pull rod 41. On the arm 39 intermediate the rod 41 and the pivot of the bell crank, a short connecting rod 42 leads to a crank 43 secured to the reverse brake cam 36, which is operated to engage and lock the reverse brake band by a clockwise motion about its pivot in Figure 3. The tip of the second arm 44 of the bell crank is connected by the link 45 to a crank 46 secured to the neutral brake cam 31. The arm 44 of the bell crank also has a connecting rod 47 pinned thereto intermediate its length and serving to operate the clutch shifting lever 37. The particular point of attachment is so chosen that in the position shown in Figure 3 the clutch is disengaged and a like remark applies to the location of the rod 42 for the reverse brake, the neutral brake being shown in engaged position wherein the rollers 30 on the levers 28 drop back slightly into the recesses provided in the cam. This slight loosening of the brake band does not release the brake for the reason that the coefficient of friction at rest is greater than when there is relative motion between the brake band and the drum so that the slight slackening simply relieves the maximum stress in the brake mechanism without reducing the holding power of the brake below a safe limit.

The operation of the unitary control mechanism is through the medium of the lever 38 and rod 41; pulling on the lever moving the rod 41 downwardly in Figure 3 and further rotating the reverse cam counterclockwise from its already disengaged position as shown in the figure. This same movement releases the neutral brake by rotating the cam 31 and pushes the forward clutch shifting lever into clutch engaging position for direct forward drive of the pulley or drum. The reverse of the above described operation first disengages the direct drive clutch and next applies the neutral brake to bring the drum or pulley to a full stop before engaging the reverse brake by a further movement of the lever 38 which at the same time releases the neutral brake. The neutral brake thus assists very materially in bringing the pulley, and the mechanism driven therefrom, to a quick stop, thus expediting reversal with less strain and wear on the forward clutch and the reverse brake band.

The brake mechanism itself affords a greatly simplified structure that is readily adjustable, as both the spring tension for retracting the brake linkage and the brake itself are adjustable to suit the operating conditions. The brake band as a whole is self wrapping and equally efficient in either direction of motion so that little force is required to operate the cam and the notches therein need not be deep to assure a positive lock in brake set position.

I am aware that many changes may be made and numerous details of construction may be varied through a wide range without departing from the principles of this invention and I therefore do not purpose limiting the patent granted thereon otherwise than necessitated by the prior art.

I claim as my invention:

1. In a device of the class described including a driving means and a final driven means, a direct drive and a reversing drive therebetween, a neutral brake adapted to stop the driven means when shifting from one drive to the other and a single operating mechanism interconnecting the direct and reverse driving mechanisms and neutral brake whereby the application of the neutral brake is automatically performed by a shift from one driving means to the other.

2. In a reversing drive, in combination with the direct and reverse engaging mechanisms, a neutral brake and operating mechanism therefore interconnected with the direct and reverse engaging mechanisms whereby the neutral brake will be applied intermediate the shift from the drive in one direction to the other.

3. A transmission including a live shaft, a drum thereon, a direct drive clutch between said shaft and drum, a reverse drive for said drum, a brake associated with said drum, means for automatically applying said brake when shifting from one drive to the other and means for automatically locking said brake in the engaged position wherein both drives are disengaged.

4. In a device of the class described including a driving means and a final driven means, a direct drive and a reversing drive therebetween, a neutral brake adapted to stop the driven means when shifting from one drive to the other and means for automatically locking said brake in the engaged position wherein both drives are disengaged.

5. In a reversing drive, in combination with the direct and reverse engaging mechanisms, a neutral brake and operating mechanism therefor interconnected with the direct and reverse engaging mechanisms whereby the neutral brake will be applied intermediate the shift from the drive in one direction to the other and means for automatically locking said brake in the engaged position wherein both drives are disengaged.

6. In a device of the class described including forward and reverse mechanisms and a neutral brake, means adapted for sequential operation of the mechanisms and brake whereby the brake will be applied during the shift from one mechanism to the other.

7. In a device of the class described including forward and reverse mechanisms and a neutral brake, means adapted for sequential operation of the mechanisms and brake whereby the brake will be applied during the shift from one mechanism to the other, and means adapted to automatically hold said neutral brake in engaged position with both drive mechanisms disengaged.

In testimony whereof I have hereunto subscribed my name.

HARRY H. WATERS.